(12) United States Patent
Hsu (10) Patent No.: US 8,657,497 B2
(45) Date of Patent: Feb. 25, 2014

(54) SLIDE-RAIL STABILIZING STRUCTURE OF RELATIVE SLIDING DEVICE

(75) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 115 days.

(21) Appl. No.: 13/193,762

(22) Filed: Jul. 29, 2011

(65) Prior Publication Data
US 2013/0028545 A1    Jan. 31, 2013

(51) Int. Cl.
*F16C 17/00* (2006.01)
*H04M 1/00* (2006.01)

(52) U.S. Cl.
USPC ............... 384/19; 379/433.12; 455/575.4; 455/575.3

(58) Field of Classification Search
USPC ......... 384/17–23, 34, 26, 50, 54; 379/433.12, 379/433.11, 433.13; 455/575.4, 455/575.1–575.3, 575.5–575.9; 361/679.39, 727, 679.01; 16/362, 363, 16/223, 86.2
See application file for complete search history.

(56) References Cited

U.S. PATENT DOCUMENTS

| | | | |
|---|---|---|---|
| 5,586,817 A * | 12/1996 | Hubbard et al. | 312/334.44 |
| 7,084,345 B1 * | 8/2006 | Chen et al. | 174/545 |
| 7,184,806 B2 * | 2/2007 | Bae | 455/575.4 |
| 7,417,865 B2 * | 8/2008 | Kim | 361/727 |
| 7,726,755 B2 * | 6/2010 | Peng et al. | 312/334.46 |
| 7,774,033 B2 * | 8/2010 | Lee | 455/575.4 |
| 2007/0032278 A1 * | 2/2007 | Lee et al. | 455/575.4 |
| 2007/0060220 A1 * | 3/2007 | Hsu | 455/575.4 |
| 2009/0005135 A1 * | 1/2009 | Lindgren et al. | 455/575.4 |
| 2009/0149230 A1 * | 6/2009 | Ruan | 455/575.4 |
| 2009/0176543 A1 * | 7/2009 | Park et al. | 455/575.4 |
| 2009/0298563 A1 * | 12/2009 | Jung et al. | 455/575.4 |

* cited by examiner

*Primary Examiner* — Alan B Waits (74) *Attorney, Agent, or Firm* — Rosenberg, Klein & Lee (57) ABSTRACT

A slide-rail stabilizing structure includes a sliding-rail frame, a sliding seat, an adjusting seat and elastic members. The sliding-rail frame includes a first sliding rail and a second sliding rail. The sliding seat provided with two sliding-seat moving objects is slidably moved along the first sliding rail. The adjusting seat has an adjusting-seat moving object abutted against the second sliding rail. The elastic members are respectively disposed between the sliding seat and the adjusting seat, so that the adjusting-seat moving objects linked by the linked adjusting seat retains an elasticity to abut against the second sliding rail, forming the sliding seat to stably assemble with and to smoothly slide on the sliding-rail frame. Meanwhile, the adjusting-seat moving object exerts a driving force on the sliding seat when the adjusting-seat moving object slides to the curved portion, thus attaining labor saving at the terminal of the sliding process.

26 Claims, 6 Drawing Sheets

SLIDE-RAIL STABILIZING STRUCTURE OF RELATIVE SLIDING DEVICE

BACKGROUND OF THE INVENTION

1. Field of the Invention

The present invention relates to a slide-rail stabilizing structure of the relative sliding device, and in particular relates to a slide-rail stabilizing structure of stable assembling, smooth sliding, and labor-saving at the terminal of the sliding process.

2. Description of the Related Art

Various sliding-cover structures are commonly applied in different electronic devices. For example, "SLIDING MODULE AND PROTABLE ELECTRONIC DEVICE USING THE SAME" disclosed by Taiwan Patent Publication No. I328088 is an invention patent case, providing a fixed mechanism fixedly connected with a fixed frame and a moving mechanism fixedly connected with a movable fixed frame. Inversely-bent hook portions disposed at both sides of the fixed frame are utilized to jacket and accommodate the edge of the two sides of the movable frame, so that the moving mechanism can be moved between a first position and a second position on the fixed frame via the movable frame relative to the fixed mechanism, and a driving force required by the moving mechanism can be provided by a wire torsion elastic member.

Further, "SLIDING-COVER DEVICE" disclosed by Taiwan Patent Publication No. I280031 is an invention patent case, including a base plate provided with guiding slot and sliding rail, an upper cover provided with a long slotted hole, and an elastic member disposed on the long slotted hole of the upper cover. The upper cover can be embedded in the sliding rail of the base plate. The guiding slot of the base plate is formed with a curve path having a surpass point. The elastic member includes two springs having fixed ends to be fixedly disposed on the outside end of the long slotted hole of the upper cover, respectively. Slide-roll members, which are respectively disposed on the free ends of the two springs and extended along in the long slotted hole of the upper cover, are displaced along the guiding slot of the base plate and pulls the springs to expand or contract when the upper cover is moved. In any case, when the slide-roll members crosses over the surpass point of the guiding slot of the base plate, the upper cover and the base plate can be automatically extended or contracted by the pulling of the elastic members.

However, although the torsion elastic member, such as a helix spring or metallic wire, of the structures above can provide the desired driving force to drive the sliding-cover structures of small-sized electronic devices (e.g., mobile phones, palm game machines or personal digital assistants (PDAs)), the jacketing relationship of the two relative sliding components and the torsion elastic member disposed therebetween cannot provide a better and stable combination structure. It is certainly that these structures above can be suitably applied to the small-sized electronic devices (e.g., mobile phones, palm game machines or PDAs) with small-sized and light sliding cover and thus the utility of operation convenience can be obtained. However, for the application of large-sized electronic devices (e.g., portable computer or tablet PCs), a moving mechanism for their sliding structure shall be relatively weighted and moving distance thereof is relatively increased. If a force is improperly applied on the moving mechanism during the operation process, partial structures tend to swing, thus reducing the smoothness of the moving mechanism or even causing the stuck of the moving mechanism.

BRIEF SUMMARY OF THE INVENTION

In view of this, the invention provides a slide-rail stabilizing structure for overcoming the disadvantages of the conventional sliding-cover combination structures.

The main purpose of the present invention is to provide a slide-rail stabilizing structure of a relative sliding device with a stable assembly configuration of between all components being not liable to loose, so that the malfunction of the assembled structure can be reduced.

Another purpose of the present invention is to provide a slide-rail stabilizing structure of a relative sliding device, to prevent the loosening or swing of between the components and to remain a stable and smooth relative sliding as the structure is suffered from single-side thrusting force.

Still another purpose of the present invention is to provide a slide-rail stabilizing structure of a relative sliding device, to have a labor-saving way by generating a driving force to continuously move the components at the terminal of the sliding process.

To attain the purpose above, the technical way adopted by the present invention comprises a sliding-rail frame, a sliding seat, an adjusting seat and at least one elastic member. The sliding-rail frame comprises a first sliding rail and a second sliding rail juxtaposed to the first sliding rail. The sliding seat provided with at least two sliding-seat moving objects is slidably moved along the first sliding rail of the sliding-rail frame. The adjusting seat has a middle section provided with at least one adjusting-seat moving object abutted against the second sliding rail of the sliding-rail frame in a direction opposite to that of the sliding-seat moving object of the sliding seat. The elastic member fixed on the sliding seat comprises at least one elastic acting portion connectively acted on the adjusting seat, so that the adjusting-seat moving objects linked by the linked adjusting seat retains an elasticity to abut against the second sliding rail of the sliding-rail frame and incorporates with the sliding-seat moving objects of the sliding seat reversely abutted against the first sliding rail of the sliding-rail frame, forming the sliding seat to stably assemble with and to smoothly slide on the sliding-rail frame.

According to the structure above, the sliding seat is provided with a guiding slot extended toward the second sliding rail of the sliding-rail frame, and the adjusting-seat moving object is outwardly extended and abutted against the second sliding rail of the sliding-rail frame through the guiding slot of the sliding seat.

According to the structure above, the guiding slot is disposed on a supporting portion, and a separation part is formed between the supporting portion and the sliding seat to accommodate the adjusting seat.

According to the structure above, the elastic members are connectively positioned on the sliding seat by a fastening component.

According to the structure above, the elastic member is a spiral spring comprising a central portion formed as a fixed end and an outer end formed as an elastic raised end.

According to the structure above, the fastening component comprises two substantially flat fastening objects utilized to correspondingly clamp the elastic member, and two fixed portions relatively projected from and respectively provided on the two substantially flat fastening objects are utilized to clamp the fixed end of the elastic member for positioning.

According to the structure above, the second sliding rail of the sliding-rail frame has two ends respectively provided with a curved portion.

According to the structure above, the sliding seat is provided with at least one jacketing portion extended from an outer periphery of the first sliding rail of the sliding-rail frame.

According to the structure above, one side of the first sliding rail of the sliding-rail frame being apart from the jacketing portion is provided with a sliding way utilized to abut against and guide the sliding-seat moving objects of the sliding seat.

According to the structure above, the jacketing portion is further connected to a jacketing member provided with a first assembling portion to jacket to the first sliding rail of the sliding-rail frame.

According to the structure above, the adjusting seat comprises two ends respectively provided with a seat portion, and the elastic acting portion of the elastic member is connectively received by the seat portion of the adjusting seat.

According to the structure above, at least one end of the sliding-rail frame is provided with a stopper utilized to limit the sliding seat sliding on the sliding-rail frame.

According to the structure above, the sliding-seat moving objects and the adjusting-seat moving object are rollers, respectively.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Referring to FIGS. 1 to 5, a slide-rail stabilizing structure of a first embodiment of the invention mainly comprises a sliding-rail frame 1, a sliding seat 2, elastic members 3 and an adjusting seat 4. The sliding-rail frame 1 comprises a first sliding rail 11 and a second sliding rail 12 juxtaposed to the first sliding rail 11, wherein a sliding way 111 (shown in FIG. 5) is formed on one side of the first sliding rail 11 corresponding to the second sliding rail 12, two curved portions 121 and 122 are respectively provided on two ends of the second sliding rail 12, and two protruded stoppers 123 and 124 are respectively provided next to the outsides of the two curved portions 121 and 122. In actual applications, two sliding-rail frames 1 can be symmetrically disposed next to the two sides of an electronic device, to relatively locate the two first sliding rails 11 at the outsides of the two second sliding rails 12. Further, the sliding-rail frame 1 is provided with a protruded stopper 13 corresponding to and disposed aside one end of the first sliding rail 11.

Figure 1:
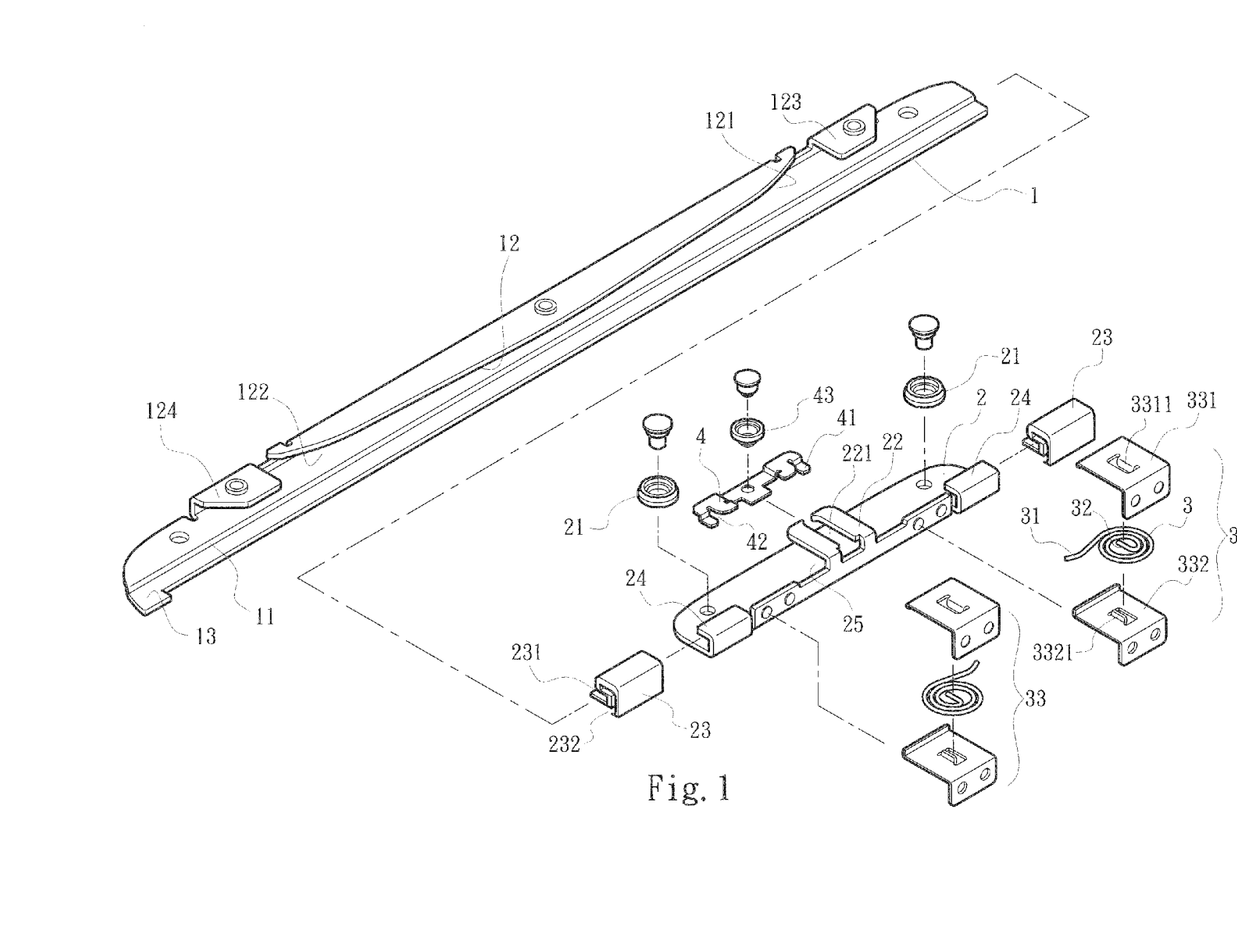
FIG. 1 is a structural exploded view of a first embodiment of the invention.
Figure 2:
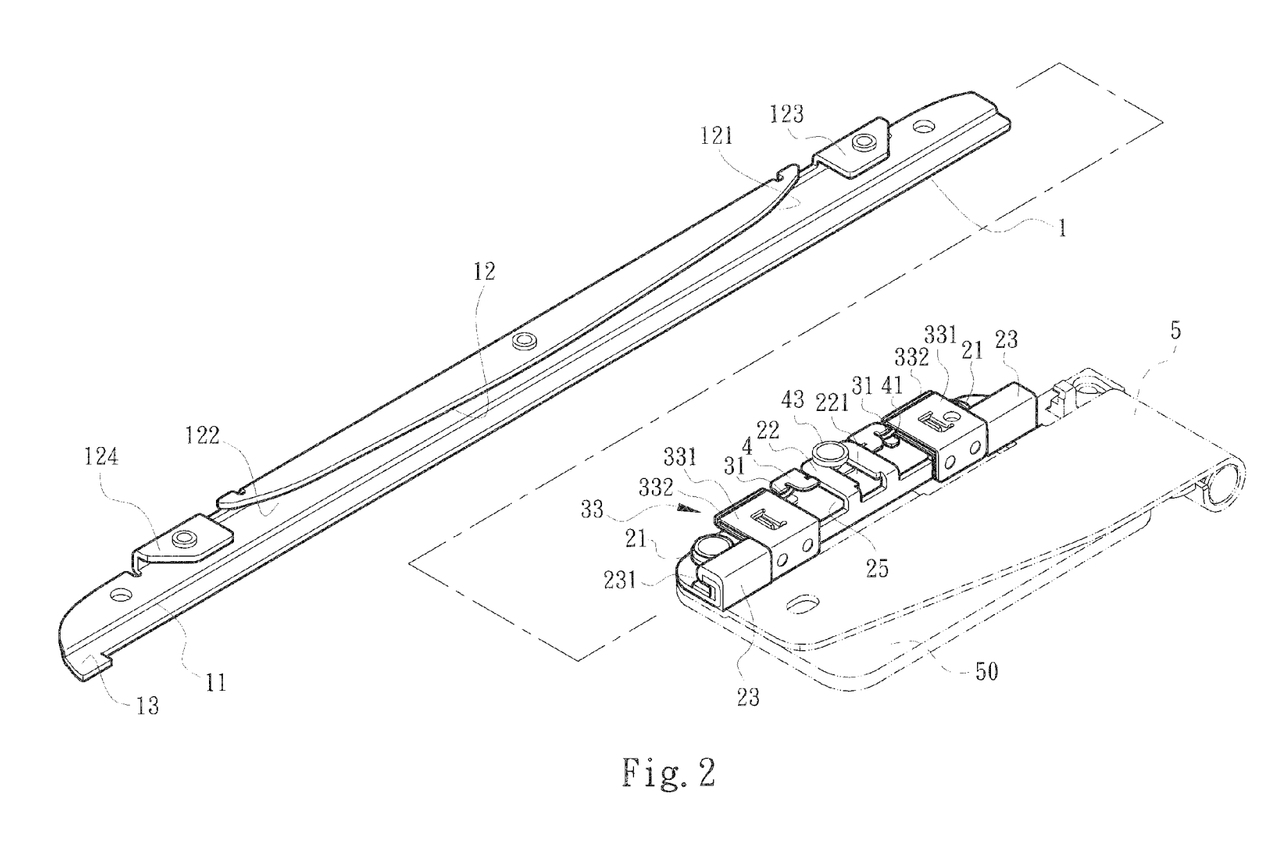
FIG. 2 is a partial assembled schematic view of the first embodiment of the invention.
Figure 3:
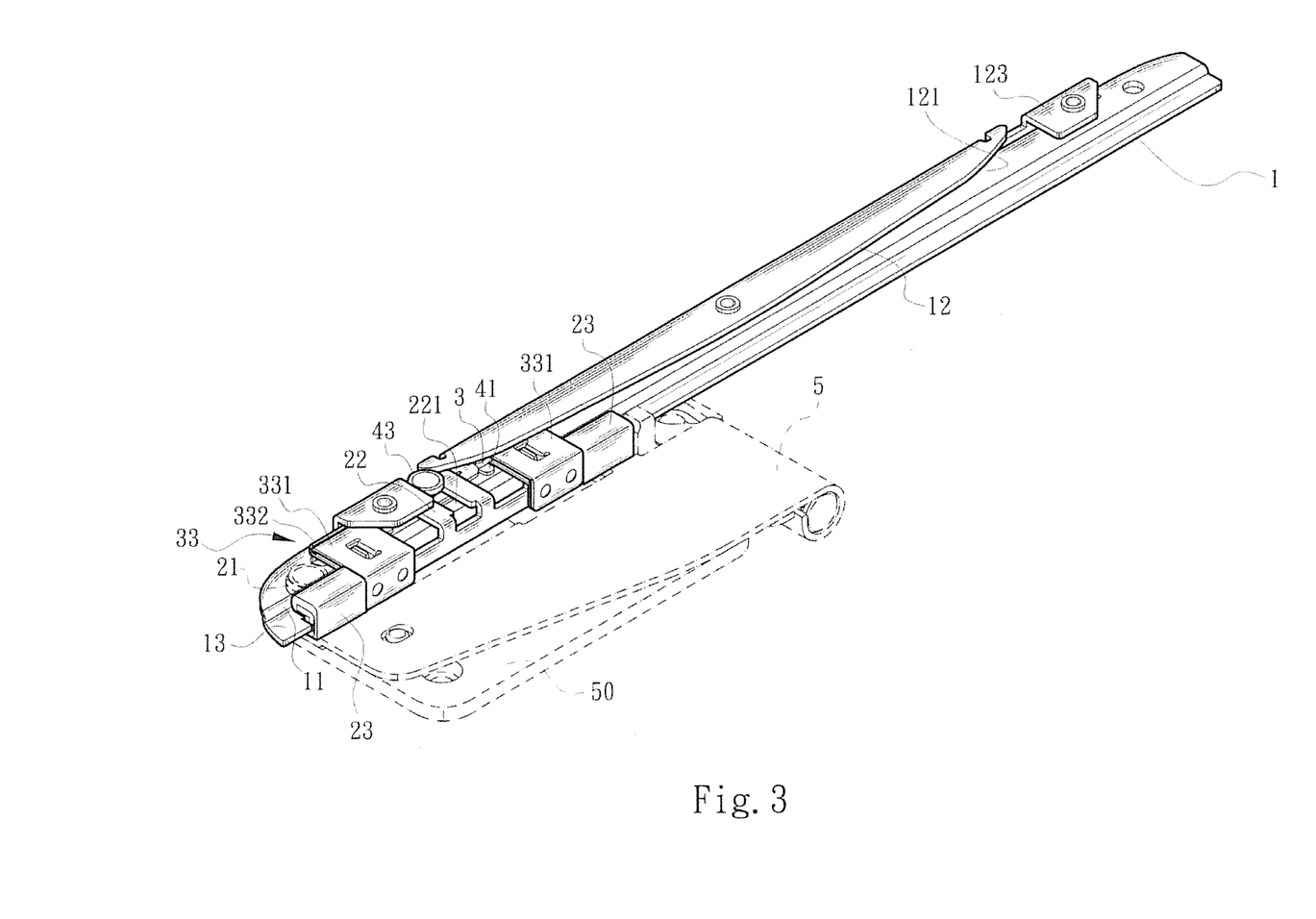
FIG. 3 is a whole assembled schematic view of the first embodiment of the invention.

Two sliding-seat moving objects 21, such as rollers to be pivoted, are respectively provided at two ends of one side of the sliding seat 2, abutted against the sliding way 111 (shown in FIG. 5) and slidably moved along the first sliding rail 11 of the sliding-rail frame 1. The sliding seat 2 is provided with a supporting portion 22, wherein a guiding slot 221 disposed on the supporting portion 22 is extended toward the second sliding rail 12 of the sliding-rail frame 1, and a separation part 25 is formed between the supporting portion 22 and the sliding seat 2. Further, two bent jacketing portions 24 are respectively provided on two sides of the sliding seat 2, extended from an outer periphery of the first sliding rail 11 of the sliding-rail frame 1. Two jacketing members 23 are provided to respectively jacket to the jacketing portions 24, each of which has a first assembling portion 231 utilized to closely jacket to the first sliding rail 11 of the sliding-rail frame 1 and a second assembling portion 232 utilized to connectively jacket or assemble to the jacketing portion 24. The adjusting seat 4 accommodated in the separation part 25 of between the supporting portion 22 and the sliding seat 2 has a middle section and at least two ends or sides. At least one adjusting-seat moving object 43, such as a roller to be pivoted, is provided on the middle section of the adjusting seat 4 to pass through and outwardly extend from the guiding slot 221 of the sliding seat 2 and to abut against the second sliding rail 12 of the sliding-rail frame 1 in a direction opposite to that of the sliding-seat moving object 21 of the sliding seat 2 abutted against the sliding way 111 of the first sliding rail 11 of the sliding-rail frame 1. Two seat portions 41 and 42 are respectively provided on the two ends of the adjusting seat 4. The elastic members 3 can be any members utilized to elastically act on the adjusting seat 4.

In this embodiment, the elastic member 3 is a spiral spring, comprising a central portion formed as a fixed end 32 and an outer end providing an elastic acting portion (it can be an elastic raised end 31). Each the elastic member 3 is connectively positioned on or fixed on the sliding seat 2 by a fastening component 33. The fastening component 33 comprises two substantially flat fastening objects 331 and 332 utilized to correspondingly clamp the elastic member 3 therebetween. Two fixed portions 3311 and 3321, relatively projected from and centrally provided on the respective substantially flat fastening objects 331 and 332, are utilized to clamp the fixed end 32 of the elastic member 3 for positioning The elastic raised ends 31 of the elastic members 3 are connectively received by the seat portions 41 and 42 of the adjusting seat 4 to connectively act on the adjusting seat 4, so that the adjusting-seat moving objects 43 linked by the linked adjusting seat 4 retains an elasticity to abut against the second sliding rail 12 of the sliding-rail frame 1.

In actual application of the described structure, the sliding seat 2 can be combined to a link member 5 (shown in FIG. 2) which is connected to a sliding cover of the electronic device or other relative sliding devices, and, if necessary, the link member 5 can be further connected to a relatively and pivotally lift-cover 50, thereby forming a multi-open sliding-cover structure.

Figure 4:
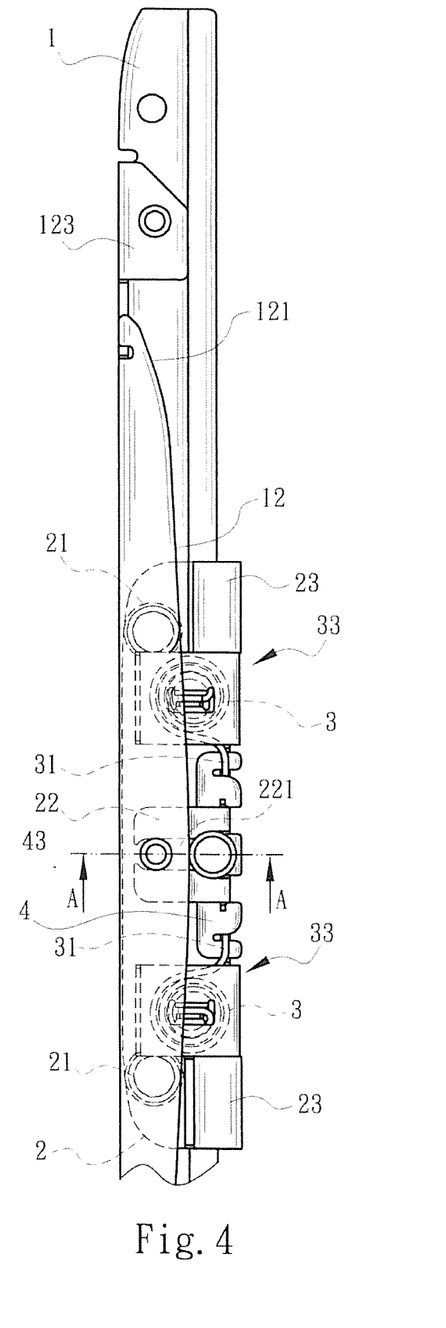
FIG. 4 is a top plan view of the first embodiment of the invention, wherein a sliding seat is in a sliding process.
Figure 5:
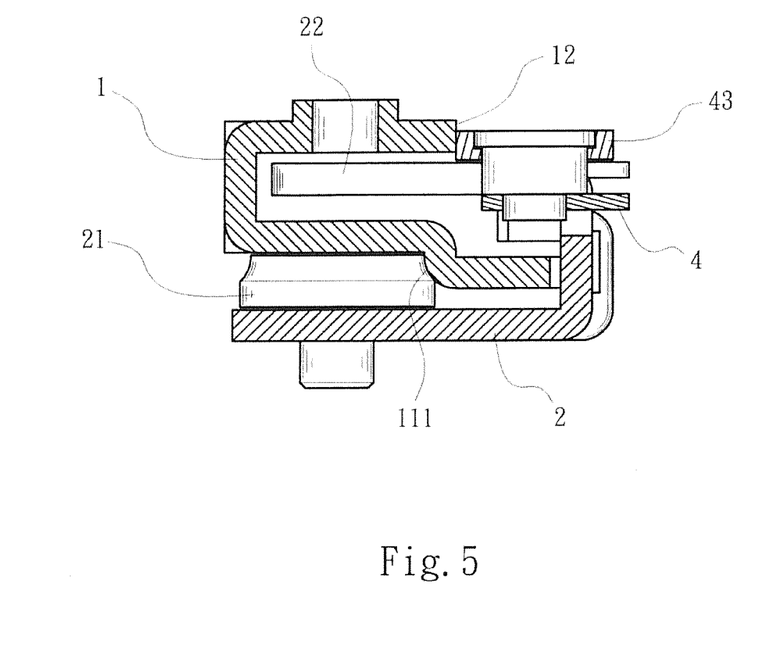
FIG. 5 is a cross sectional view of line A-A in FIG. 4.
Figure 6:
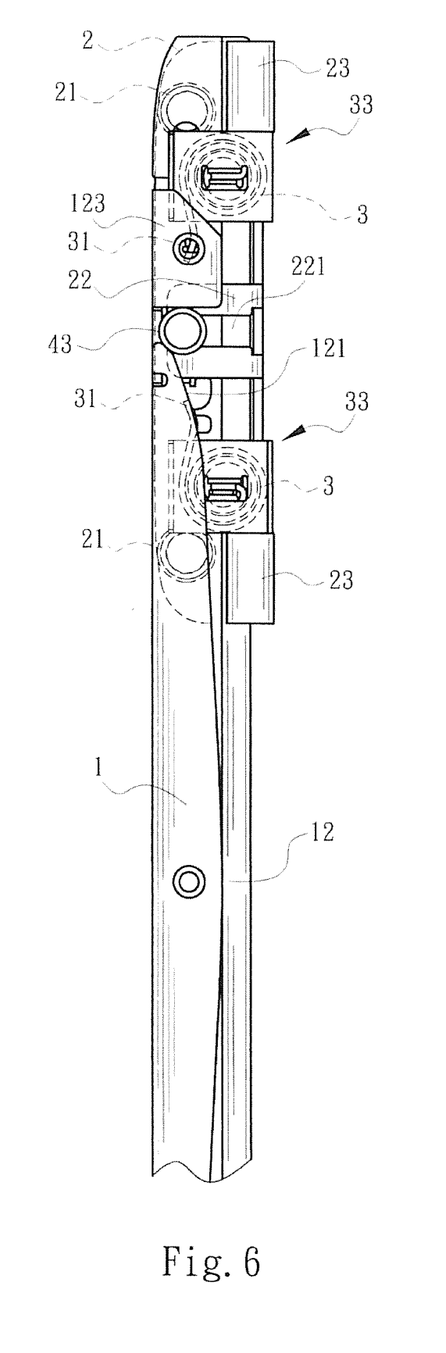
FIG. 6 is a top plan view of the first embodiment of the invention, wherein the sliding seat is slid to an end.

Referring to FIGS. 4 and 6, in the operation of the structure of the first embodiment, by incorporating the adjusting-seat moving objects 43 linked by the linked adjusting seat 4 to abut against the second sliding rail 12 of the sliding-rail frame 1 with the sliding-seat moving objects 21 of the sliding seat 2 to reversely abut against the first sliding rail 11 of the sliding-rail frame 1, the sliding seat 2 can be stably assemble with and to smoothly slide on the sliding-rail frame 1. When the sliding seat 2 sliding along the first sliding rail 11 of the sliding-rail frame 1 approaches the end of the sliding-rail frame 1 and the adjusting-seat moving object 43 simultaneously slides to the curved portion 121 or curved portion 122 provided on the end of the second sliding rail 12, the curved portion 121 (or curved portion 122) can exert a reacting force on the adjusting-seat moving object 43 to drive the sliding seat 2 to continuously slide along the first sliding rail 11 of the sliding-rail frame 1 via the linked adjusting seat 4 without any additional external force acting on the sliding seat 2, and the adjusting-seat moving object 43 cannot be further slid until the adjusting-seat moving object 43 is stopped by the protruded stopper 123 (or the protruded stopper 124) (it can be also that one end of the sliding seat 2 sliding along the first sliding rail 11 of the sliding-rail frame 1 is stopped by the protruded stopper 13). Thus, with the described structure of the embodiment above, the relative sliding device can have a structure provided with an automatic driving effect at the terminal of the sliding process.

Figure 7:
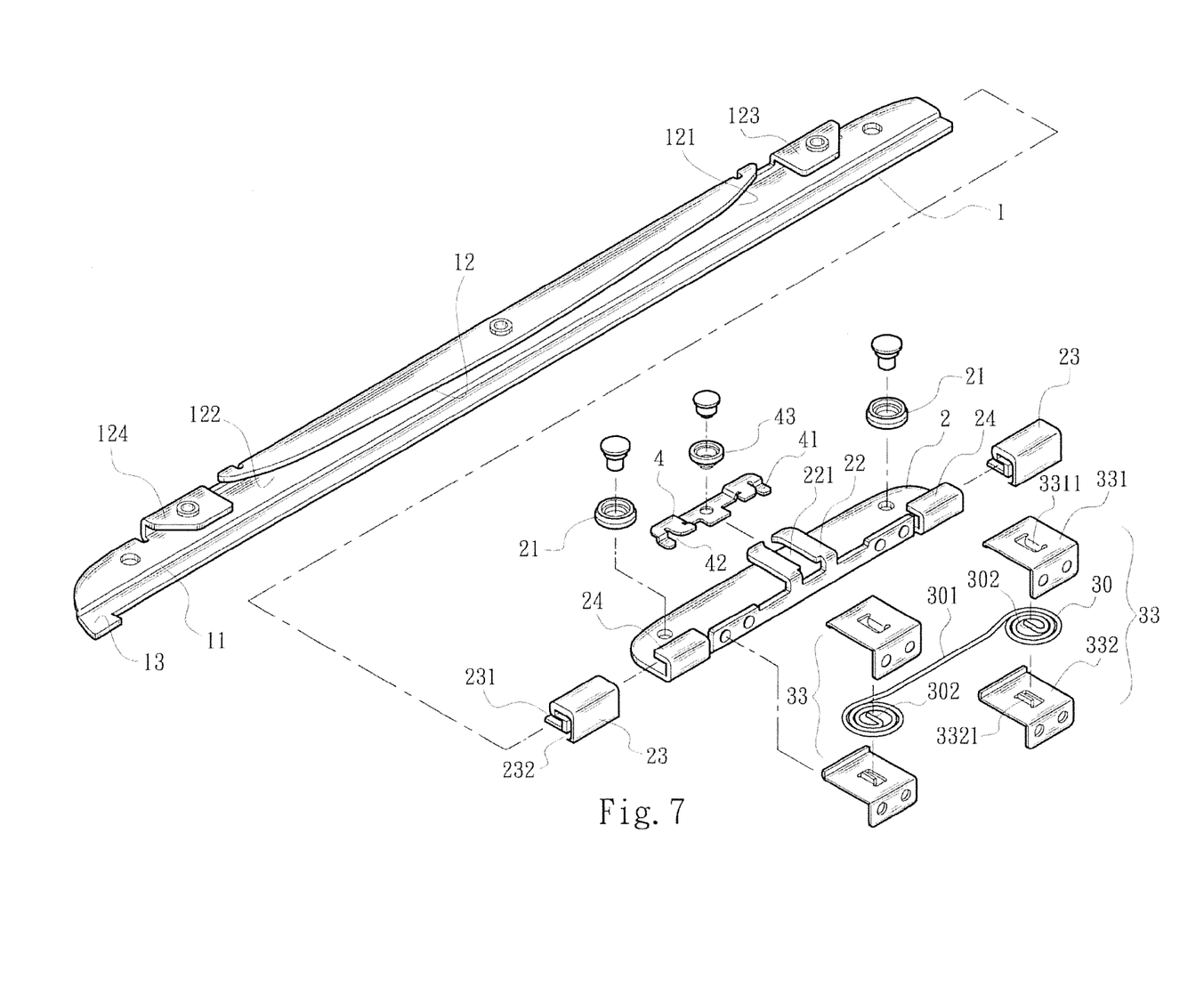
FIG. 7 is a structural exploded view of a second embodiment of the invention.

Referring to FIG. 7, the structure of a second embodiment of the present invention comprises the same components of the sliding-rail frame 1, the sliding seat 2 and the adjusting seat 4 of the first embodiment, and an elastic member 30. The elastic member 30 has a middle section providing an abutting portion 301 capable of engaging the seat portions 41 and 42 of the adjusting seat 4 and flexibly acting on the adjusting seat 4, the abutting portion 301 has two ends respectively provided with a volute elastic portion, and a fixed end 302 is centrally provided on each of the elastic portions, so that the elastic member 30 is connectively fixed on the sliding seat 2 by utilizing the same fastening component 33 of the first embodiment to clamp the fixed end 302 and generates an elasticity to drive the adjusting-seat moving object 43 to flexibly abut against the second sliding rail 12 of the sliding-rail frame 1. Since the structure and assembling conditions of the rest components of the second embodiment are the same as the first embodiment, their descriptions are omitted.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A. slide-rail stabilizing structure of a relative sliding device, at least comprising:
    a sliding rail-frame comprising a first sliding rail and a second sliding rail integrally formed in one piece formation, the second sliding rail being disposed vertically above the first sliding rail;
    a sliding seat provided with at least two sliding-seat moving rollers, said at least two sliding-seat moving rollers slidably moving along the first sliding rail of said sliding-rail frame, each sliding-seat moving roller being sandwiched between a bottom surface of the first sliding rail of said sliding rail frame and the sliding seat;
    an adjusting seat disposed on said sliding seat said adjusting seat having a middle section provided with at least one adjusting-seat moving roller abutted against the second sliding rail of the sliding-rail frame; and
    at least one elastic member fixed on said seat and having at least one elastic acting portion connectively acting on the adjusting seat, wherein said at least one adjusting-seat moving roller linked by the adjusting seat is elastically biased to abut against the second sliding rail of the sliding-rail frame, and wherein said sliding-rail frame is sandwiched between said at least one adjusting-seat moving roller and said each sliding-seat moving roller of the sliding seat, whereby the sliding seat is assembled with the sliding-rail frame to slide therealong.

2. The slide-rail stabilizing structure of the relative sliding device as claimed in claim 1, wherein said sliding seat is provided with a guiding slot extended toward the second sliding rail of the sliding-rail frame, and wherein said at least one adjusting-seat moving roller is received within the guiding slot and is outwardly extended therefrom to abut the second sliding rail of said sliding-rail frame.

3. The slide-rail stabilizing structure of the relative sliding device as claimed in claim 2, wherein the guiding slot is disposed on a supporting portion, and a separation part is formed between the supporting portion and the sliding seat to accommodate the adjusting seat.

4. The slide-rail stabilizing structure of the relative sliding device as claimed in claim 2, wherein said at least one elastic member is connectively positioned on the sliding seat by a fastening component.

5. The slide-rail stabilizing structure of the relative sliding device as claimed in claim 2, wherein the second sliding rail of said sliding-rail frame has two ends respectively provided with a curved portion.

6. The slide-rail stabilizing structure of the relative sliding device as claimed in claim 2, wherein said sliding seat is provided with at least one jacketing portion extended therefrom to engage an outer periphery of the first sliding rail of said sliding-rail frame.

7. The slide-rail stabilizing structure of the relative sliding device as claimed in claim 6, wherein an inner edge of the first sliding rail of said sliding-rail frame is provided with a sliding way utilized to abut against and guide said at least two sliding-seat moving rollers of the sliding seat.

8. The slide-rail stabilizing structure of the relative sliding device as claimed in claim 6, further comprising a jacketing member disposed in the jacketing portion, wherein the jacketing member comprises a first assembling portion jacketed to the first sliding rail of said sliding-rail frame and a second assembling portion assembled to the jacketing portion.

9. The slide-rail stabilizing structure of the relative sliding device as claimed in claim 2, wherein at least one end of said sliding-rail frame is provided with a stopper utilized to limit the sliding seat sliding on the sliding-rail frame.

10. The slide-rail stabilizing structure of the relative sliding device as claimed in claim 1, wherein said at least one elastic member is connectively positioned on the sliding seat by a fastening component.

11. The slide-rail stabilizing structure of the relative sliding device as claimed in claim 10, wherein said at least one elastic member is a spiral spring comprising a central portion formed as a fixed end and an outer end formed as an elastic raised end, and the elastic raised end is the elastic acting portion of said at least one elastic member.

12. The slide-rail stabilizing structure of the relative sliding device as claimed in claim 11, wherein said adjusting seat comprises two ends respectively provided with a seat portion, and said at least one elastic raised end of said at least one elastic member is connectively received by the seat portion of the adjusting seat.

13. The slide-rail stabilizing structure of the relative sliding device as claimed in claim 11, wherein the fastening component comprises two substantially flat fastening objects utilized to correspondingly clamp said at least one elastic member, and two fixed portions relatively projected from and respectively provided on the two substantially flat fastening objects are utilized to clamp the fixed end of said at least one elastic member for positioning.

14. The slide-rail stabilizing structure of the relative sliding device as claimed in claim 10, wherein said at least one elastic member has a middle section providing an abutting portion to flexibly act on the adjusting seat, wherein the abutting portion is the elastic acting portion of the elastic member, wherein the abutting portion has two ends respectively provided with a volute elastic portion, and wherein a fixed end is centrally provided on each of said at least one elastic portions.

15. The slide-rail stabilizing structure of the relative sliding device as claimed in claim 14, wherein each of the adjusting seats comprises two ends respectively provided with a seat portion, and said at least one elastic raised end of said at least one elastic member is connectively received by the seat portion of the adjusting seat.

16. The slide-rail stabilizing structure of the relative sliding device as claimed in claim 10, wherein the second sliding rail of said sliding-rail frame has two ends respectively provided with a curved portion.

17. The slide-rail stabilizing structure of relative sliding device as claimed in claim 10, wherein said sliding seat is provided with at least one jacketing portion extended therefrom to engage an outer periphery of the first sliding rail of said sliding-rail frame.

18. The slide-rail stabilizing structure of the relative sliding device as claimed in claim 10, wherein at least one end of said sliding-rail frame is provided with a stopper utilized to limit the sliding seat sliding on the sliding-rail frame.

19. The slide-rail stabilizing structure of the relative sliding device as claimed in claim 1, wherein the second sliding rail of said sliding-rail frame has two ends respectively provided with a curved portion.

20. The slide-rail stabilizing structure of the relative sliding device as claimed in claim 19, wherein said sliding seat is provided with at least one jacketing portion extended therefrom to engage an outer periphery of the first sliding rail of said sliding-rail frame.

21. The slide-rail stabilizing structure of the relative sliding device as claimed in claim 19, wherein at least one end of said sliding-rail frame is provided with a stopper utilized to limit the sliding seat sliding on the sliding-rail frame.

22. The slide-rail stabilizing structure of the relative sliding device as claimed in claim 1, wherein said sliding seat is provided with at least one jacketing portion extended therefrom to engage an outer periphery of the first sliding rail of said sliding-rail frame.

23. The slide-rail stabilizing structure of the relative sliding device as claimed in claim 22, wherein an inner edge of the first sliding rail of said sliding-rail frame is provided with a sliding way utilized to abut against and guide said at least two sliding-seat moving rollers of the sliding seat.

24. The slide-rail stabilizing structure of the relative sliding device as claimed in claim 22, further comprising a jacketing member disposed in the jacketing portion, wherein the jacketing member comprises a first assembling portion jacketed to the first sliding rail of said sliding-rail frame and a second assembling portion assembled to the jacketing portion.

25. The slide-rail stabilizing structure of the relative sliding device as claimed in claim 22,wherein at least one end of said sliding-rail frame is provided with a stopper utilized to limit the sliding seat sliding on the sliding-rail frame.

26. The slide-rail stabilizing structure of the relative sliding device as claimed in claim 1, wherein at least one end of said sliding-rail frame is provided with a stopper utilized to limit the sliding seat sliding on the sliding-rail frame.

\* \* \* \* \*